Aug. 9, 1927.  1,638,059
F. PUCEK
SOUND RECORDING MECHANISM
Filed Feb. 4, 1926  2 Sheets-Sheet 1

Inventor
F. Pucek
By Clarence A. O'Brien
Attorney

Aug. 9, 1927. 1,638,059
F. PUCEK
SOUND RECORDING MECHANISM
Filed Feb. 4, 1926 2 Sheets-Sheet 2
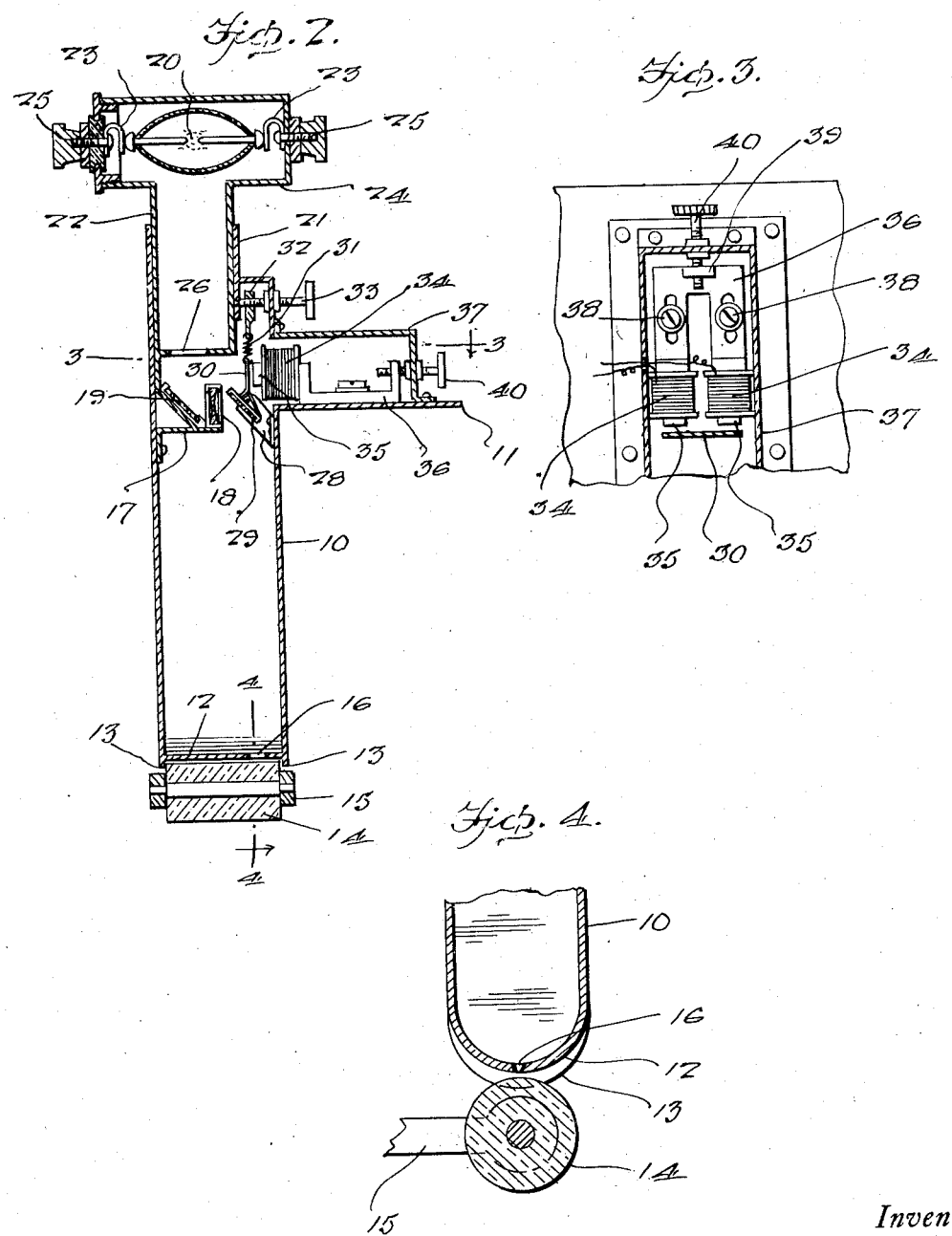
Inventor
F. Pucek
By Clarence A O'Brien
Attorney

Patented Aug. 9, 1927.

1,638,059

UNITED STATES PATENT OFFICE.

FERDINAND PUCEK, OF JOHNSON CITY, NEW YORK.

SOUND-RECORDING MECHANISM.

Application filed February 4, 1926. Serial No. 85,999.

This invention relates to improvements in sound recording mechanisms, and particularly to a device of this character, wherein light rays are employed to record the sound vibrations on a photo sensitive substance film in a special manner.

An object of the invention resides in providing a sound recording device employing a suitable source of light adapted to projection onto a movable photosensitive film and suitable mechanism for controlling the projection of said light onto the film responsive to sound vibrations for varying the projection of the light onto the film in a predetermined manner in order to record the waves of sounds operating said controlling mechanism.

Another object of the invention resides in providing a source of light for projection onto a movable photosensitive film and suitable means for controlling the projection of light on said film, adapted for electrical operation in accordance with received sound vibrations to be recorded, and to vary the position of the light onto said film, for producing an image of the sound waves.

A further and more specific object of the invention, resides in providing the sound recording mechanism in which a movable reflecting surface controls the projection of light from a source onto a photosensitive film adapted for movement in recording sound and electrical operating means for moving the mirror responsive to the pulsating current in an electric circuit including said operating means, carrying the sound to be recorded and adapted to provide a movement of the light reflected by said mirror onto the film to produce an image of the sound thereon.

A still further object of the invention is to provide the mechanism of this character, which is adapted for use with motion picture cameras for recording sound simultaneously pictures where desired.

The invention comprehends numerous other objects residing in the details of construction and arrangement of parts which are more particularly pointed out in the following detailed description and in the claims directed to a preferred form of the invention, it being understood, however, that various changes in the size, shape and arrangement of the parts may be made without departing from the spirit and scope of the invention herein set forth.

In the drawings forming part of this application:

Fig. 2 is a vertical transverse sectional view through the sound recording mechanism shown in Fig. 1.

Fig 3 is a horizontal sectional view taken on line 3—3 of Fig. 2.

Fig. 4 is a vertical sectional view taken on line 4—4 of Fig. 2.

Figure 1:
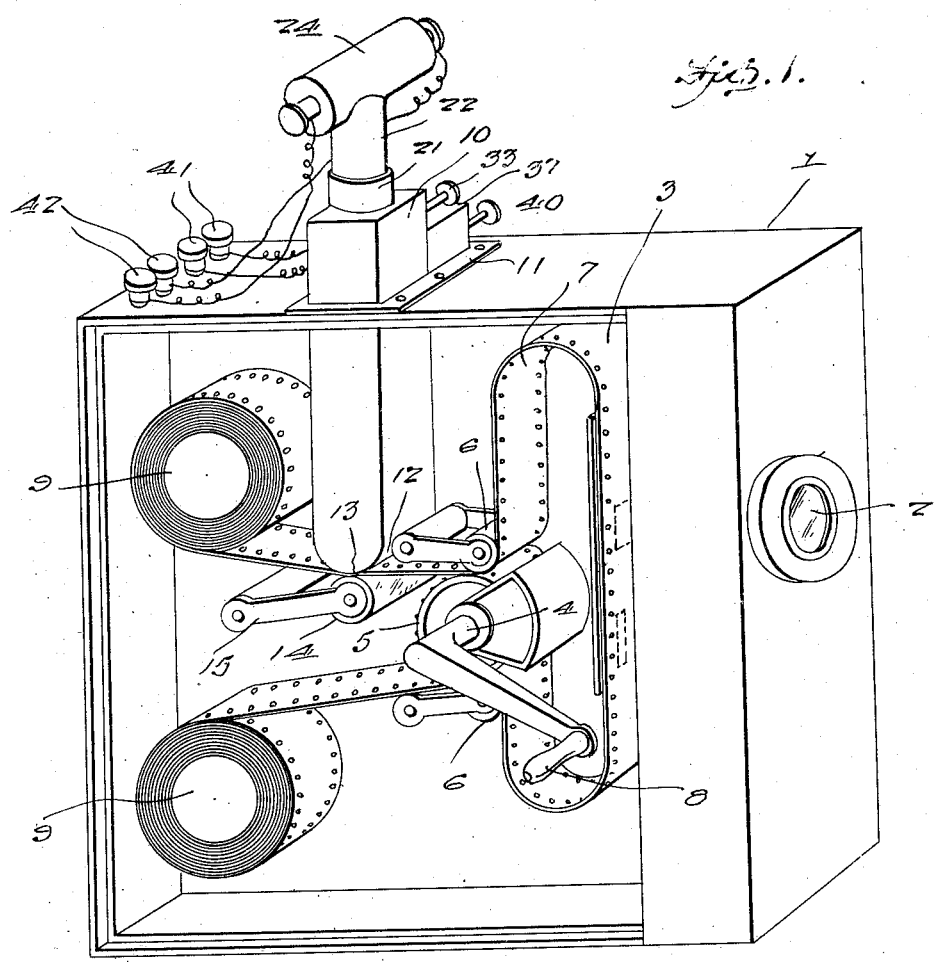
Figure 1 is a perspective view of the motion picture camera, showing the application of sound recording mechanism of this invention applied thereon, the cover plate for the camera case being removed.

A motion picture camera is indicated at 1, having the usual housing mounting the photographic lens mechanism 2, and open at one side as indicated at 3 for removably receiving a suitable form of cover plate. Within the camera housing is suitably mounted a shaft 4 carrying sprocket wheels 5 with which cooperates the movable idler rollers 6 for retaining the film 7 in engagement with the surface of the sprocket wheel 5 during the operation of the handle 8 which rotates the shaft 6. The film will thus be suitably fed through the machine and the photographic mechanism operated to make the series of pictures on the film in the usual and well known manner.

The film is mounted on a pair of reels 9 removably mounted in the camera which may be of any desired construction used in the art.

In making provisions for the present invention, an opening is cut in the top portion of the camera casing 1 for receiving the housing 10 of the sound recording apparatus which is formed with a flange 11 adapted to engage the upper face of the camera case and mount the sound recording apparatus in the case in a predetermined manner.

The lower end portion of the casing 10 is semi-cylindrical as indicated at 12 and at the opposite ends is formed with guide flanges 13 for retaining the film 7 in a predetermined position with respect to the end of the casing. A roller 14 is rotatably mounted in a suitable frame 15 carried by the camera case 1 and resiliently projected toward the end of the casing 10 so as to retain the film 7 in uniform engagement with the end of said casing.

The cylindrical end 12 of the casing 10 at the point of contact of the roller 14 therewith is formed with a very narrow elongated slot 16 adapted to permit a line of light to be projected therethrough onto a predetermined portion of a film strip as it passes between the roller and the end of the casing in a manner as shown in Fig. 1 in the recording of the sound thereon.

In the upper portion of the casing 10, the shelf 17 supports a condensing lens 18 for focusing the light from the fixed reflector 19 which is also mounted on the shelf 17 in angular relation so as to reflect the light from the source 20 through the axis of the condensing lens 18.

The upper end of the casing 10 is formed with a cylindrical neck 21 for slidably receiving the lamp housing 22 carrying the source of light 20 which may be any suitable form of lamp such as is adapted for the purpose and which is shown mounted between the contacts 23. These contacts 23 are mounted in opposite ends of the transversely extending heads 24 of the lamp housing and having connection with suitable binding posts 25 for receiving the electric circuit connections adapted to interpose the lamp circuit with a source of electrical energy. The lower end of the lamp housing 22 is formed with an opening 26 for permitting the projection of a stream of light onto the mirror 19 for reflection through the condensing lens 18.

A suitable bracket 28 is mounted on one side of the housing 10 opposite to the shelf 17 and rotatably supports a movable reflector 29. This reflector is provided with a resilient operating arm 30 the free end of which has one end of the coiled spring 31 secured thereto while the opposite end is attached to the movable block 32 threadedly mounted on the adjusting screw 33 rotatably mounted in the upper end portion of the casing 10 and the lower end portion of the sleeve 21 as clearly shown in Fig. 2.

The operation of this screw adjustment 33 will move the block member 32 laterally with respect to the casing 10 and slightly rotate the movable mirror 29 on its mounting in the bracket 28, which is for the purpose of adjusting the projection of light from the source 20 so that it will strike the end portion 12 at the lower end of the casing in such a manner that one edge will intersect the central portion of the opening 16 therein.

The operating means for the movable mirror 29 is a suitable electromagnetic means in connection with which the arm 30 is associated and forms an armature. The electromagnet 34 has a suitable core 35 adapted to direct the magnetic field into the armature member 30 so that variations in the intensity of the magnetic field will produce a relative operation of the armature and consequent rotation or oscillation of the movable reflector 29 which will change the position of light projection through the opening 16 in the bottom of the casing. This electromagnet 34 and the core 35 are carried by the U-shaped bracket 36 mounted in the lateral extension 37 on the casing 10 and retained for limited sliding movement therein by the screws 38 extending through slots in the opposite legs thereof.

The bridge portion of this U-shaped member 36 is formed with a laterally extending lug 39 in which the set screw 40 is threadedly mounted. This set screw 40 is rotatably mounted in the extension 37 of the casing as clearly shown in Figs. 2 and 3 so that in the rotation thereof, a sliding movement will be imparted to the U-shaped supporting member 36 so as to vary the position of the end of the pole piece 35 and the electro-magnet 34 with respect to the operating member 30 for the movable mirror 29.

The camera casing 1 is provided with suitable binding posts 41 for receiving the circuit connection for the electro-magnet 34 while binding posts 42 serve to connect the source of light 20 with a suitable source of power.

In recording sound with this mechanism, the electro-magnet 34 is interposed in circuit with a suitable apparatus for receiving sound impulses and transforming the same into corresponding electrical impulses in the circuit with the electro-magnet 34. The electrical impulses, carrying the sound waves will be of a pulsating character, so that the strength of the magnetic field of the electromagnet 34 will be varied in synchronism with the pulsations of the current which will operate on the arm 30 of the movable mirror 29 to produce an oscillating movement thereof responsitive to the variations in the magnetic field resulting in an oscillation of the beam of light reflected by the movable mirror 29 having the edge portions projecting through the slot 16 in the end of the housing.

Figure 7:
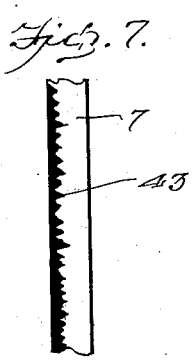
Figure 6:
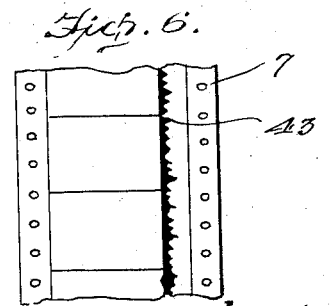

In the oscillation of this beam of light reflected from the movable mirror 29, the edge portion will vary in its position with respect to the end of the slot 16 and in the movement of a photo-sensitive film under the end of the housing as shown in Fig. 1. the photo-sensitive substance on the film will be acted on by the light to develop an image of sound waves as shown in Figs. 6 and 7 and indicated by the numeral 43. Fig. 6 shows a sound record applied to a portion of a motion picture film strip while Fig. 7 shows a similar sound record applied to a narrow sound record strip in which the beam of light reflected by the mirror 29 is projected to overlie one end portion of the slot, so that only one edge of the oscillation of the light beam is recorded on the film.

Figure 5:
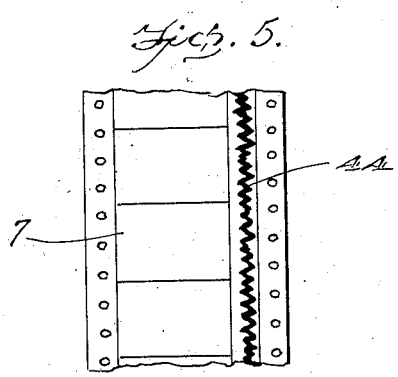
Figs. 5, 6 and 7 are views of portions of film strips, showing the manner in which the invention records the sound on the photosensitive portion of the film.

Under some conditions, it may be desirable to provide special light beams and slot constructions so that both edges of the light beam will be photographed in its movement to show the full oscillation on the photographic record of the film. A result of this character is shown in Fig. 5, and for this purpose, the slot must be substantially longer than the width of the light beam, so that in the oscillation of the mirror 29, the slot will be long enough to permit the projection of the light beam through the same in all positions. It will produce a record as indicated by the numeral 44 in Fig. 5, in which the width of the light beam will be equal to the thickness of the photo-sensitive record thereof as illustrated in the drawing.

Any suitable and desired apparatus can then be used for reproducing this light from the sound record on the film strip in an efficient and desired manner.

It will be apparent from the above description, that a highly practical form of photographic sound recording mechanism has been provided for recording sound waves independently or simultaneously with the taking of pictures in a motion picture camera.

Having thus described my invention, what I claim as new is:—

1. A sound recording mechanism, comprising a tubular casing, having one end formed to movably receive a sound recording strip, said casing having a narrow elongated slot formed in the end of the casing movably receiving said film, a source of light mounted in the opposite end of the casing, movable means mounted in the last named end of said casing, a movable reflector operable to reflect light from said source into the end of the casing formed with the slot onto said strip, resilient means connecting the reflector and said movable means, manually rotatable means for operating the movable means for adjusting the normal position of said reflector, and electro-magnetic means adjustably mounted in said casing energizable for cooperation with the resilient means to oscillate said reflector to record variations of the energization of said electro-magnetic means on said film strip.

2. A sound recording mechanism, comprising an elongated tubular casing, a narrow elongated slot in one end of said casing, the end of the casing formed with said slot being adapted to movably receive a recording strip in association therewith, a cylindrical neck formed on and extending beyond the opposite end of the casing, a lamp housing adjustably mounted in said neck, a source of light in said lamp housing, a shelf mounted intermediate the ends of said casing, a reflector mounted on said shelf for reflecting light from said source laterally in the casing, a second reflector rotatably mounted opposite said first reflector in the casing, an armature member mounted on and extending from said movable reflector, resilient means normally maintained under tension in connection with said armature member, means forming an anchor for said resilient means adapted for adjustment laterally with respect to the line of tension of said resilient means for rotating said reflector in a predetermined manner, and adjustable electro-magnetic means adjacent to said armature and in spaced relation thereto adapted to oscillate said movable reflector for oscillating a beam of light projecting thereby through the slotted end of said casing in accordance with current fluctuations in said means.

3. A sound recording mechanism, comprising a support, said support being formed to have a recording strip movably associated therewith, a source of light mounted in said support, a movable reflector mounted in said support, for reflecting light from said source onto said recording strip, a screw member rotatably mounted in said support, a block member threadedly mounted on said screw member, resilient means connecting said block member with said reflector operable to normally retain the reflector in one position, said screw member being adapted to adjust the normal position of the reflector and electro-magnetic means energizable from a modulated current supply adapted to cooperate with the resilient means for oscillating the reflector in accordance with the current fluctuation in said electro-magnetic means.

In testimony whereof I affix my signature.

FERDINAND PUCEK.